J. WAMPACH.
Sleigh.

No. 103,396.    Patented May 24, 1870.

Witnesses:

Inventor:
J. Wampach

United States Patent Office.

JOHN WAMPACH, OF SHAKOPEE, MINNESOTA.

Letters Patent No. 103,396, dated May 24, 1870.

IMPROVED BOB-SLED.

The Schedule referred to in these Letters Patent and making part of the same.

*To all whom it may concern:*

Be it known that I, JOHN WAMPACH, of Shakopee, in the county of Scott and State of Minnesota, have invented a new and useful Improvement in Bob-Sled; and I do hereby declare that the following is a full, clear, and exact description thereof, which will enable others skilled in the art to make and use the same, reference being had to the accompanying drawings forming part of this specification, in which—

My invention has for its object to furnish an improved bob-sled, which shall be strong, durable, and convenient, each runner being allowed to move independent of the others, to adjust itself to the surface of the ground; and It consists in the construction and combination of various parts of the sled, as hereinafter more fully described.

Figure 1:
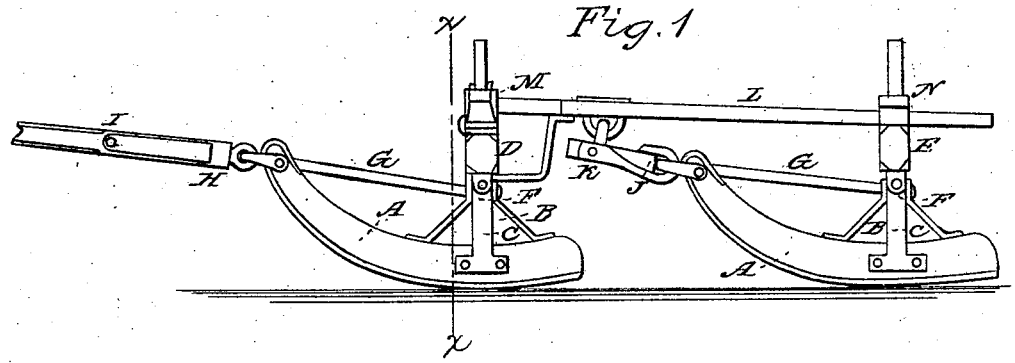
Figure 1 is a side view of my improved bob-sled.
Figure 3:
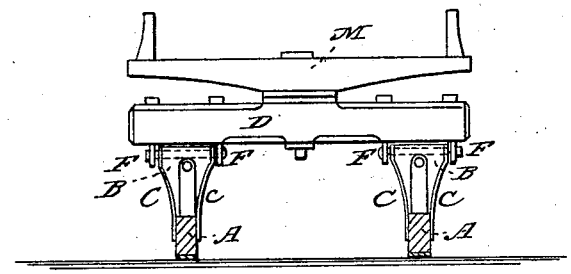
Figure 3 is a vertical cross-section of the forward bob taken through the line $x\,x$, fig. 1.

A are the runners of the bob-sled, each of which is made with a single knee, B, the lower end of which is securely attached to the runners A, and which is braced and strengthened before and behind, as shown in figs. 1 and 3.

To the outer and inner sides of the knees B and runners A are attached inverted T-irons C, the upper ends of which project above the upper ends of the knees B, and have eyes formed in them.

D is the forward beam, and

E is the rear beam.

In each end of each of the beams D E are placed two eye-bolts, F, in such positions that the eyes of said bolts may overlap the eyes of the T-irons C, so that a bolt may be passed through the four eyes at each of the knees B, to pivot the runners each independently of the others, to the said beams.

G are the draft-bars, the rear ends of which are secured to the knees B, and the forward ends of which extend forward to the forward ends of the runners A, are bent over to form loops $g'$, and are securely bolted to the said forward ends of the said runners.

Figure 2:
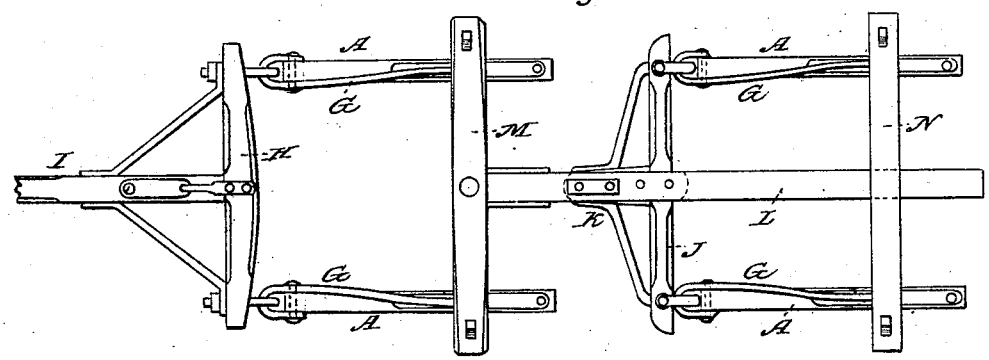
Figure 2 is a top view of the same.

H is the cross-bar of the tongue I, which is connected to the loops of the draft-bars G by eye-bolts, loops, or clevises, as shown in figs. 1 and 2.

To the loops of the draft-irons of the rear runners A is connected a cross-bar, J, by eye-bolts, loops, or clevises, as shown in figs. 1 and 2.

To the middle part of the cross-bar J is attached a short tongue, K, to the forward end of which is attached a loop, eye-bolt, or clevis, through the eye or loop of which is passed a loop, clevis, or eye-bolt, adjustably attached to the long reach L, so that the bobs may be conveniently adjusted at a greater or less distance apart, as may be desired.

The forward end of the reach L is secured to the forward bolster M, and its rear end passes through a hole or mortise in the rear bolster N.

Having thus described my invention,

I claim as new and desire to secure by Letters Patent—

1. The combination of the T-irons C, eye-bolts F, and pivoting bolts with the knees and beams of the sled, substantially as herein shown and described, and for the purpose set forth.

2. The combination of the cross-bar J, short tongue K, and long reach L with the forward ends of the runners of the rear bob, and with the forward and rear bolsters M N, substantially as herein shown and described and for the purpose set forth.

JOHN WAMPACH.

Witnesses:
G. L. CASTER,
D. W. COULTHARD.